(12) United States Patent
Bates et al.

(10) Patent No.: US 8,279,783 B1
(45) Date of Patent: Oct. 2, 2012

(54) LINEAR-EQUIVALENT ECHO AND NEXT CANCELLERS FOR TOMLINSON-HARASHIMA PRECODING (THP) SYSTEMS

(75) Inventors: Stephen Bates, Canmore (CA); Hossein Sederat, San Jose, CA (US)

(73) Assignee: Aquantia Corporation, Milpitas, CA (US)

( * ) Notice: Subject to any disclaimer, the term of this patent is extended or adjusted under 35 U.S.C. 154(b) by 1820 days.

(21) Appl. No.: 11/501,324

(22) Filed: Aug. 9, 2006

Related U.S. Application Data (60) Provisional application No. 60/708,015, filed on Aug. 12, 2005.

(51) Int. Cl.
*H04B 3/20* (2006.01)
(52) U.S. Cl. ......... 370/286; 370/289; 375/296; 375/346
(58) Field of Classification Search .............. 370/286, 370/289, 352, 465, 466, 522; 375/220, 222, 375/229, 233, 232, 267, 289, 296, 317, 346, 375/355
See application file for complete search history.

(56) References Cited

U.S. PATENT DOCUMENTS

| | | | | |
|---|---|---|---|---|
| 6,167,082 A * | 12/2000 | Ling et al. | ...................... | 375/233 |
| 6,414,989 B1 * | 7/2002 | Olafsson et al. | ............... | 375/229 |
| 6,597,746 B1 * | 7/2003 | Amrany et al. | ................ | 375/296 |
| 6,813,351 B1 * | 11/2004 | Tahernezhadi | ........... | 379/406.01 |
| 8,009,823 B2 * | 8/2011 | Parhi et al. | ................ | 379/390.02 |
| 2002/0118702 A1 * | 8/2002 | Turner et al. | .................... | 370/466 |
| 2003/0016770 A1 * | 1/2003 | Trans et al. | .................... | 375/346 |
| 2003/0086515 A1 * | 5/2003 | Trans et al. | .................... | 375/346 |
| 2004/0252755 A1 * | 12/2004 | Jaffe et al. | ...................... | 375/233 |
| 2006/0039458 A1 * | 2/2006 | Ding | .............................. | 375/232 |
| 2007/0237270 A1 * | 10/2007 | Mezer et al. | ................... | 375/346 |
| 2008/0212715 A1 * | 9/2008 | Chang | ............................ | 375/317 |
| 2010/0260245 A1 * | 10/2010 | Parhi et al. | ..................... | 375/220 |

* cited by examiner

*Primary Examiner* — Hassan Phillips
*Assistant Examiner* — Ajay Cattungal
(74) *Attorney, Agent, or Firm* — Lance M. Kreisman, Esq.; Mahamedi Paradice Kreisman LLP (57) ABSTRACT

In one implementation, a transceiver is provided that includes a precoder to pre-equalize a data signal transmitted from the transceiver. The transceiver further includes an interference cancellation system to substantially cancel interference from a data signal received by the transceiver. The precoder and the interference cancellation system share at least one common input signal.

8 Claims, 8 Drawing Sheets

LINEAR-EQUIVALENT ECHO AND NEXT CANCELLERS FOR TOMLINSON-HARASHIMA PRECODING (THP) SYSTEMS

CROSS-REFERENCE TO RELATED APPLICATIONS

This application claims benefit under 35 USC 119(e) of Provisional Application No. 60/708,015, filed on Aug. 12, 2005.

FIELD OF THE INVENTION

The present invention relates generally to signal processing, and more particularly to reducing interference in a communication system.

BACKGROUND OF THE INVENTION

Pulse-amplitude modulation (PAM) is a form of signal modulation where the message information is encoded in the amplitude of a series of signal pulses. For example, a two bit modulator (PAM-4) takes two bits at a time and maps the signal amplitude to one of four possible levels—e.g., (−3 volts, −1 volt, 1 volt, and 3 volts). Demodulation of an amplitude encoded signal is generally performed by detecting the amplitude level of the carrier at every symbol period. Pulse-amplitude modulation is typically utilized within Ethernet communication systems. For example, a 100BASE-T2 Ethernet medium typically utilizes PAM-5 modulation over two wire pairs, while a 1000BASE-T Ethernet medium utilizes PAM-5 modulation running over 4 wire pairs. In such communication systems, simple precoding (or pre-equalization) is sometimes applied at a transmitter to reduce inter-symbol interference (ISI).

In certain communication systems (for example 802.3an), PAM is combined with a more complex pre-equalization scheme denoted Tomlinson-Harashima Precoding (THP). When THP is implemented in a system, equalization that was previously done in the communication receiver can be shifted to the corresponding communication transmitter. This is done in such a way that the overall complexity of the system is reduced.

Figure 1:
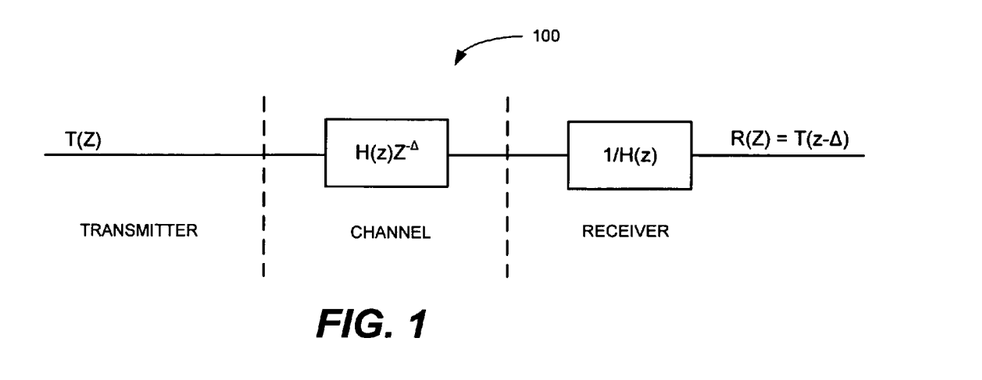
FIG. 1 is a block diagram of a communication system in the Z-domain.
Figure 2:
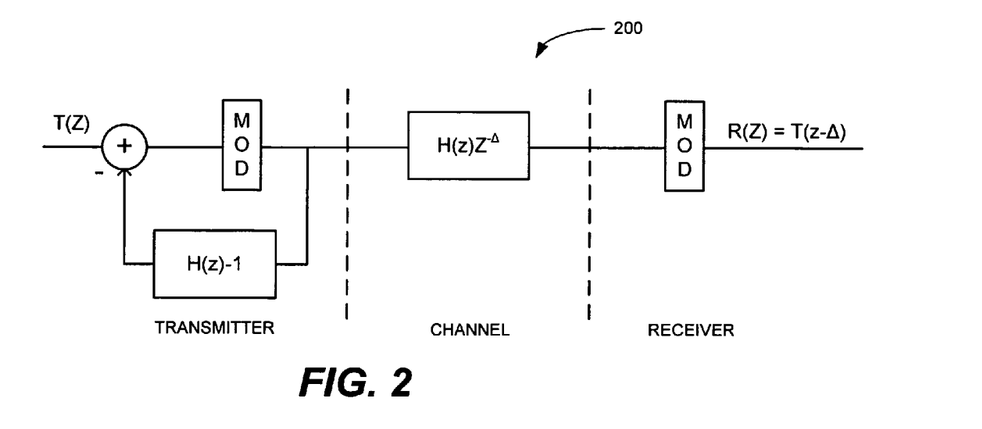
FIG. 2 is a block diagram of a communication system in the Z-domain that is equivalent to the communication system of FIG. 1.

For example, FIG. 1 shows a communication system 100 including a channel with Z-domain response $\{H(z)Z^{-\Delta}\}$ that is equalized by a filter in a receiver with response $\{(1/(H(z))\}$. The received waveform $\{R(z)\}$ is equal to the transmit waveform $\{T(z)\}$ delayed by the bulk delay of the channel $(\Delta)$—i.e., $\{R(z)=T(z-\Delta)\}$. A communication system 200 with THP that is equivalent to the communication system 100 is illustrated in FIG. 2. Note the channel is identical in both FIG. 1 and FIG. 2, however, in FIG. 2 the filtering operation is moved to the transmitter, and the complex filter in the receiver has been replaced by a modulo operation. The modulo operation is such that for any input x, the corresponding output y is given by the following equation:

$$y(k)=x(k)-m(k)\Omega \quad \text{(eq. 1)}$$

Where $\Omega$ is a fixed sized value and $\{m(k)\}$ is an integer that is chosen to ensure that the resultant $\{y(k)\}$ lies within some range $(-L, L]$. Typically, $\Omega$ is chosen to be 2L. Here, m(k) denotes the number of modulo wraps at time k and $\Omega$ represents the magnitude of a single modulo wrap.

The transmitter shown in FIG. 2 is more complex than the transmitter of FIG. 1. In addition, the channel characteristic $\{H(z)\}$ may not be known by the transmitter. In this case a fixed filter may be used, or a more complex training scheme may allow the determination of the ideal coefficients by the receiver and the communication of these coefficients back to the transmitter. Although THP is often desirable, THP does suffer from a number of disadvantages when compared to a classical system.

For example, as previously noted, the channel coefficients may not be known at the transmitter and need to be determined or selected in some way. Moreover, in almost all cases, the number of PAM levels at the output of the THP block is much higher than the number of PAM levels at the input. As an example, in an 802.3 communication scheme, the input to the THP block is PAM-16 and hence can be represented using four binary bits. The output of the THP, however, consists of 1024 levels and hence requires ten binary bits. This increase is due to the fact that representing the output shown in FIG. 2 requires representing the output of the filter, which output is a function of the filter coefficients. In this worst case, representing the output of the filter requires ten bits. This large increase in bits has implications for both the design of the digital-to-analog converter (DAC) and the echo/NEXT cancellation filters.

Figure 4:
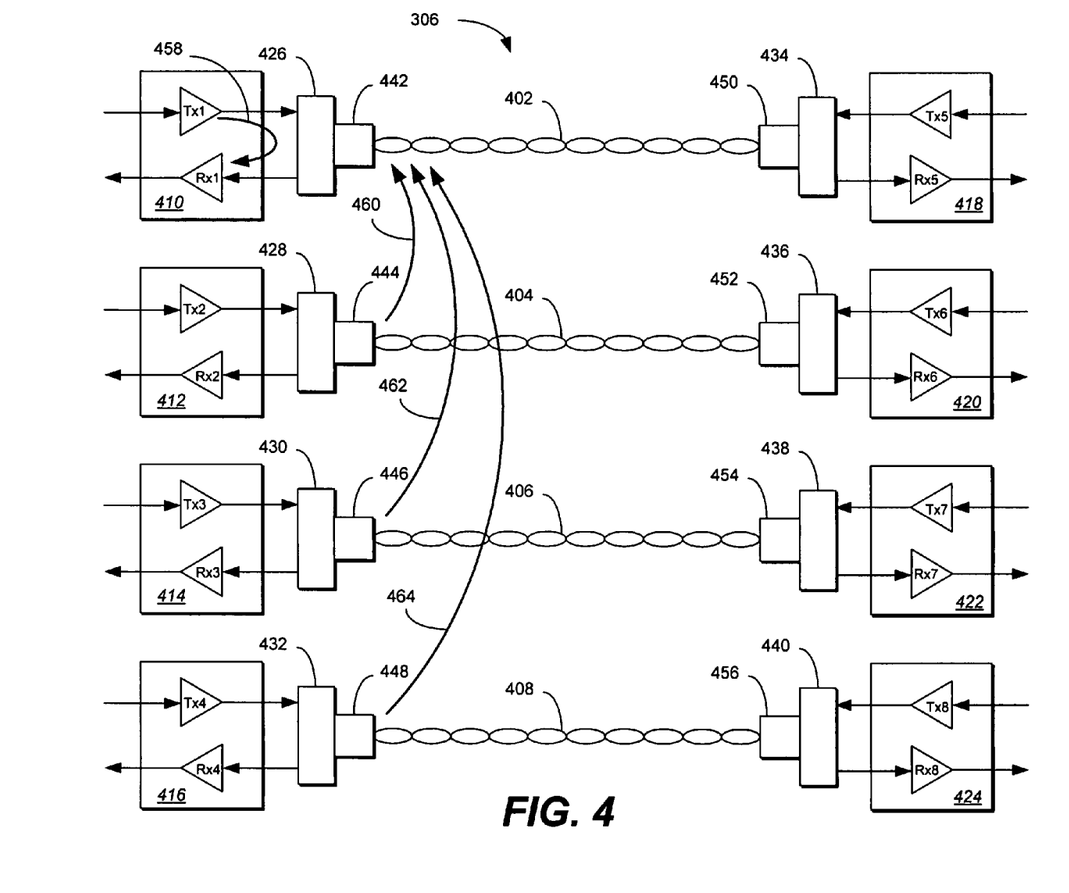
FIG. 4 is a block diagram of a plurality communication channels, each with a transceiver at each end.

Another other core component in many communication systems is a cancellation system. In any communication system that permits both the transmission and reception of data on the same channel at the same time (e.g., a full duplex system), some of the transmit energy can transfer into the local receiver and cause interference. Depending on the nature of this impairment (or interference), such transmit energy may be denoted echo or Near-End Cross Talk (NEXT). FIG. 4, discussed in greater detail below, illustrates the sources of echo and NEXT in a four dimensional full-duplex communication system.

Since the data that causes both echo and NEXT is known (because the data is generated by the local transmitter), echo and NEXT can be substantially cancelled using echo and NEXT cancellation systems. In such cancellation systems one or more filters are implemented and fed with the same data that is generated by one or more corresponding local transmitters. Often, the exact nature of the echo or NEXT is initially unknown and these filters are adapted using standard algorithms such as Least Mean Square (LMS) adaptation. Adaptation is generally performed using blocks denoted Adaptation Engines (AEs) that alter the coefficients of the filter in such a way as to mimic the echo as much as possible. By subtracting the output of the cancellation filter(s) from the received signal, the echo/NEXT can be substantially removed.

In VLSI (very large scale of integration) implementations of echo and NEXT filters, a key parameter that determines power and area and speed is the number of bits required to represent the input data. Typically, the power and area metrics are linearly related to this parameter. Therefore, to optimize the design, it is desirable to keep the input data bit-widths into echo and NEXT filters as small as possible. The present invention addresses such a need.

BRIEF SUMMARY OF THE INVENTION

In general, in one aspect, this specification describes a transceiver that includes a precoder to pre-equalize a data signal transmitted from the transceiver. The transceiver further includes an interference cancellation system to substantially cancel interference from a data signal received by the transceiver. The precoder and the interference cancellation system share at least one common input signal.

Implementations can include one or more of the following features. The precoder can implement Tomlinson-Harashima Precoding (THP). The interference cancellation system can comprise an echo canceller, and inputs to the echo canceller can be given by inputs to the precoder and modulo wrap values. The interference cancellation system can further comprise a Near-End Cross Talk (NEXT) canceller. The echo canceller can comprise one or more adaptive filters for generating a signal to mimic echo within a data signal received by the transceiver. The transceiver can further include a subtractor to subtract the signal generated by the one or more adaptive filters from the data signal received by the transceiver to substantially remove echo from the received data signal.

In general, in another aspect, this specification describes a method comprising pre-equalizing a data signal transmitted from a transceiver using a precoder, and substantially cancelling interference from a data signal received by the transceiver using an interference cancellation system. The precoder and the interference cancellation system share at least one common input signal.

Implementations can include one or more of the following advantages. A Tomlinson-Harishma Precoder and some combination or singularity of NEXT and echo cancellers are provided and combined in such a manner as to reduce the overall complexity of the cancellers. In one implementation, a linear equivalence model of the Tomlinson-Harishma Precoder is used to reduce total bit-widths at the input to the cancellers and, therefore, reduce the overall complexity of the cancellers (e.g., in terms of design constraints and power consumption). The cancellers can be adaptative in nature and can still train and achieve good performance in the presence of the proposed linear equivalence system. In one aspect, the linear equivalence system replaces the classical modulo operation with an auxillary signal that represents the number of modulo wraps at any given time, times the magnitude of the modulo wrap itself. In addition, a single canceller filter may be replaced with one or more filters where the input to the first filter is the input to the Tomlinson-Harishma Precoder block and the input to the other filters is some combination or permutation of the modulo replacement signal. This may or may not be done in such a way that the overall width of the combined inputs is less than it would be in a classical system.

The details of one or more implementations are set forth in the accompanying drawings and the description below. Other features and advantages will be apparent from the description and drawings.

BRIEF DESCRIPTION OF THE DRAWINGS

Like reference symbols in the various drawings indicate like elements.

DETAILED DESCRIPTION OF THE INVENTION

The present invention relates generally to data communications, and more particularly to reducing interference in data communication systems. In particular, the present invention addresses the combination of THP, echo/NEXT cancellation and power/area optimization in a communication system. The following description is presented to enable one of ordinary skill in the art to make and use the invention and is provided in the context of a patent application and its requirements. The present invention is not intended to be limited to the implementations shown but is to be accorded the widest scope consistent with the principles and features described herein.

Figure 3:
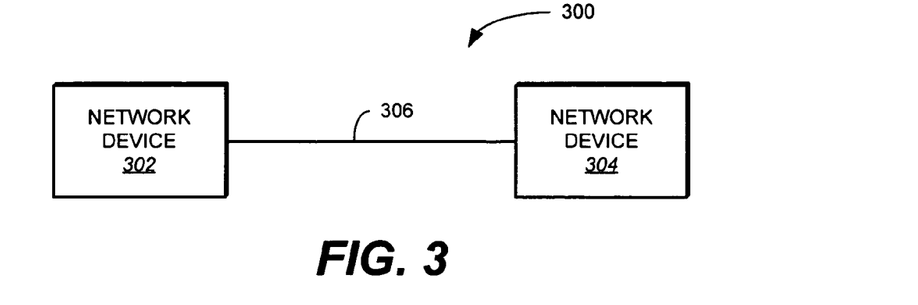
FIG. 3 is a block diagram of a communication system.

FIG. 3 shows a communication system 300 in accordance with one implementation of the invention. The communication system 300 includes a network device 302 and a network device 304. The network devices 302, 304 can comprise computers, switches, routers, hubs, gateways, and similar devices. Two network devices are shown by way of example—the communication system 300, however, can contain a different number of network devices. The network device 302 communicates with the network device 304 through a communication line 306.

Referring to FIG. 4, in one implementation, the communication line 306 includes four twisted pairs of wires 402-408 (or channels) that are connected to transceivers 410-424 through corresponding connectors 442-456. In one implementation, the transceivers 410-424 are IEEE 10 GBASE-T compliant. In one implementation, hybrid circuits 426-440 are used at the ends of each twisted pair of wires 402-408 to control access to a corresponding communication channel for full-duplex bidirectional operation. In addition impairments (e.g., interference) such as echo 458 and Near-End Cross Talk (NEXT) 460, 462, 464 (here shown only for receiver Rx1) may be present.

Figure 5:
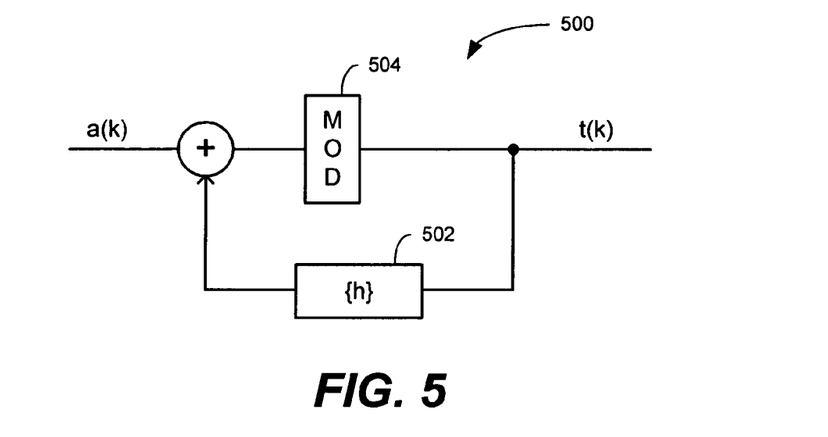
FIG. 5 is illustrates a Tomlinson-Harashima precoding (THP) model for a receiver in a communication system.

FIG. 5 $\Omega$ shows a Tomlinson-Harashima precoding (THP) model 500 for a transmitter, e.g., transmitter Tx1 of transceiver 410 (FIG. 4). As shown in FIG. 5, (in one implementation) the data stream $\{a(k)\}$ is amplitude encoded according to a typical bi-dimensional linear modulation format. The constellation values are selected in such a way that both the real and imaginary parts fall into the interval $[-L, L)$. The fundamental principle of Tomlinson-Harashima precoding is the location of a feedback filter 502 with a transfer function that inverts the channel impulse response and pre-equalizes the data. To prevent the transmitted amplitudes from increasing at an unacceptable level, a modulo operator 504 (e.g., a modulo-2L arithmetic) is placed within the transmitter. The modulo operator 504 generates both the real and imaginary parts of the precoder output $\{t(k)\}$ in such a way that they fall into the interval $[-L, L)$.

Figure 6:
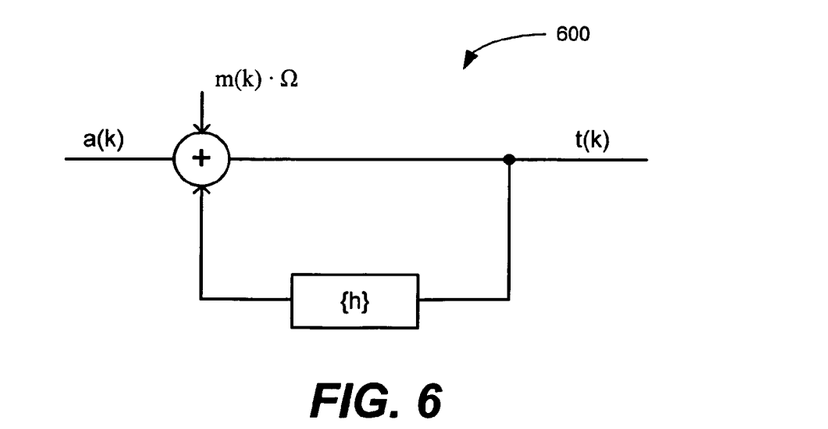
FIG. 6 illustrates an equivalent signal model to the Tomlinson-Harashima precoding (THP) model of FIG. 5.
Figure 7:
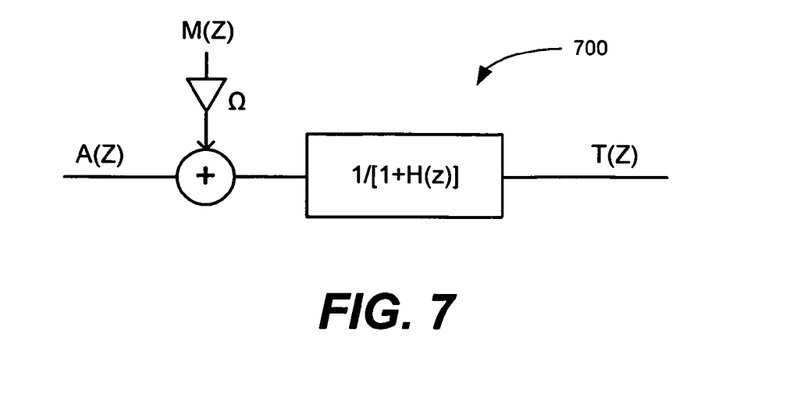
FIG. 7 illustrates a Z-domain model of the signal model of FIG. 6.
Figure 8:
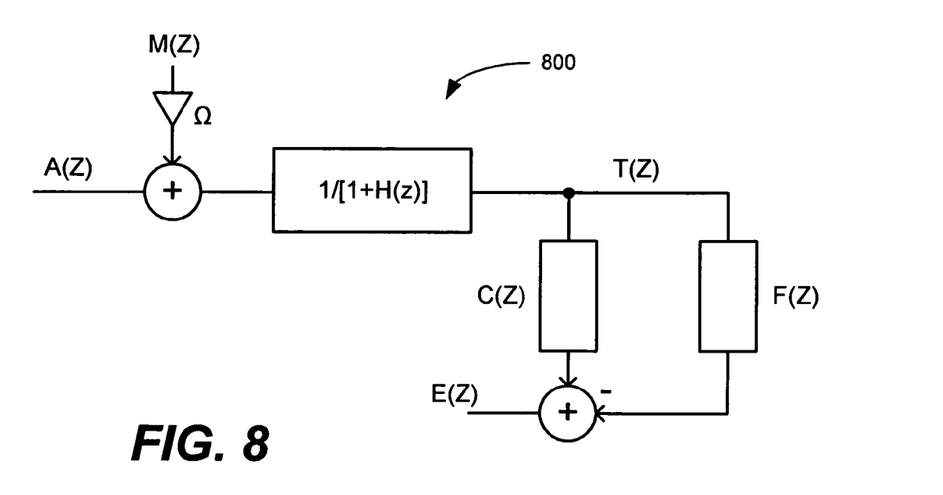
FIG. 8 illustrates an echo canceller in the z-domain.

FIG. 6 illustrates an equivalent signal model 600 to the Tomlinson-Harashima precoding (THP) model 500 of FIG. 5. Referring to FIG. 6, $\{m(k)\}$ represents the number of modulo "wraps" required at time k, and $\Omega$ is equal to the magnitude of a single modulo wrap. The signal model 600 can be redrawn in the Z-domain as represented by the Z-domain model 700 of FIG. 7. The Z-domain model 700 is a linear system. Echo, such as echo 458 shown in FIG. 4, can be introduced with coefficients given by the set {f}, and an echo canceller can be provided having taps at time t given by {c(t)}. Note that the output of the echo canceller can be subtracted from the received signal. The resultant is an error signal that can be denoted e(k). The error signal has a z-domain response E(z) as shown in the echo canceller 800 of FIG. 8. The echo canceller 800 has an optimum solution when:

$$C(z)=F(z). \qquad (\text{eq. 2})$$

One solution to equation 2 above is given as follows:

$$c_i(t)=f_i \forall i: |f_i|>0, \qquad (\text{eq. 3})$$

i.e., when all the canceller filter taps equal all the non-zero taps in the impairment response. Also note that an optimum solution, based on the stochastic gradient and LMS (Least Median of Squares) theory, can be obtained if {c(k)} is adapted in accordance with the following equation:

$$ci(k)=ci(k-1)+\Delta e(k)t(k-i), \qquad (\text{eq. 4})$$

where $\Delta$ is a suitably chosen step-size.

Figure 9:
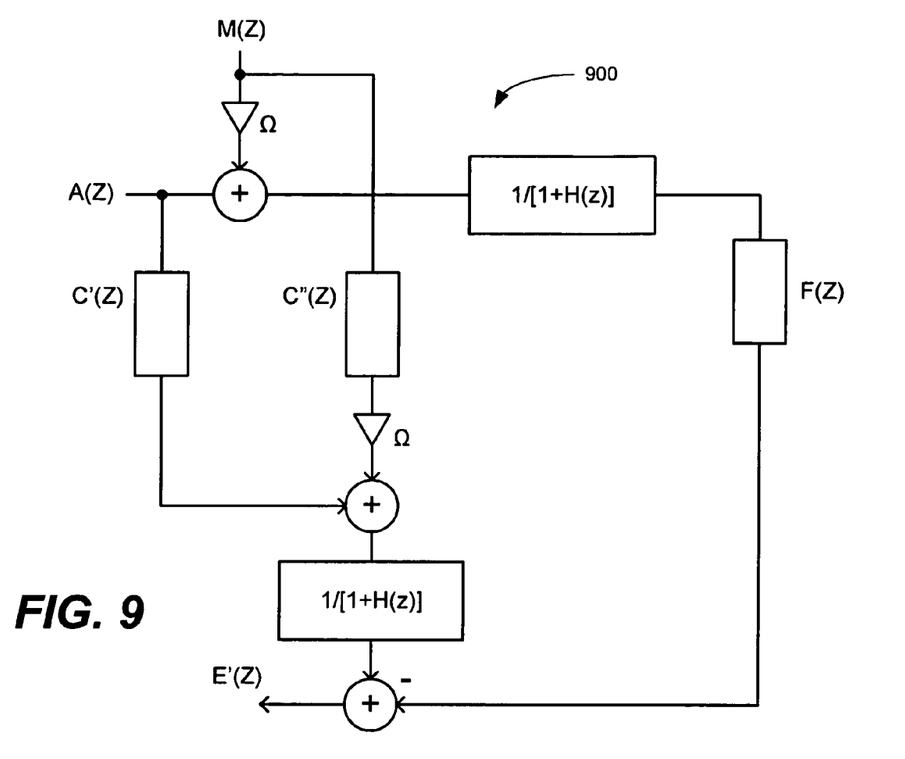
FIG. 9 illustrates an echo canceller that is a linear equivalent to the echo canceller of FIG. 8.

Since the echo canceller 800 is a linear system, component of the echo canceller 800 can be moved to obtain a linear equivalent echo canceller 900 as shown in FIG. 9. The optimal solution to the echo canceller 900 is given by the same set of coefficients as given in equation 3, as follows:

$$c'_i(k)=c''_i(t)=f_i. \qquad (\text{eq. 5})$$

The inputs to the echo canceller 900 are given by the inputs to the THP and the modulo wrap values. Therefore, in one implementation, the precoder and the interference cancellation system share at least one common input signal. In one implementation, the inputs are expressed using 6.5 bits instead of 10 bits. More often, the combined number of input bits will be less in the linear equivalent system than in the original system. Accordingly, in one implementation, the number of PAM levels at the input to the echo canceller is only slightly higher than the number of PAM levels at the input of the THP (e.g., less than 2 bits greater). In one implementation, the number of PAM levels at the input to the echo canceller is equal to the number of PAM levels at the input of the THP.

Figure 10A:
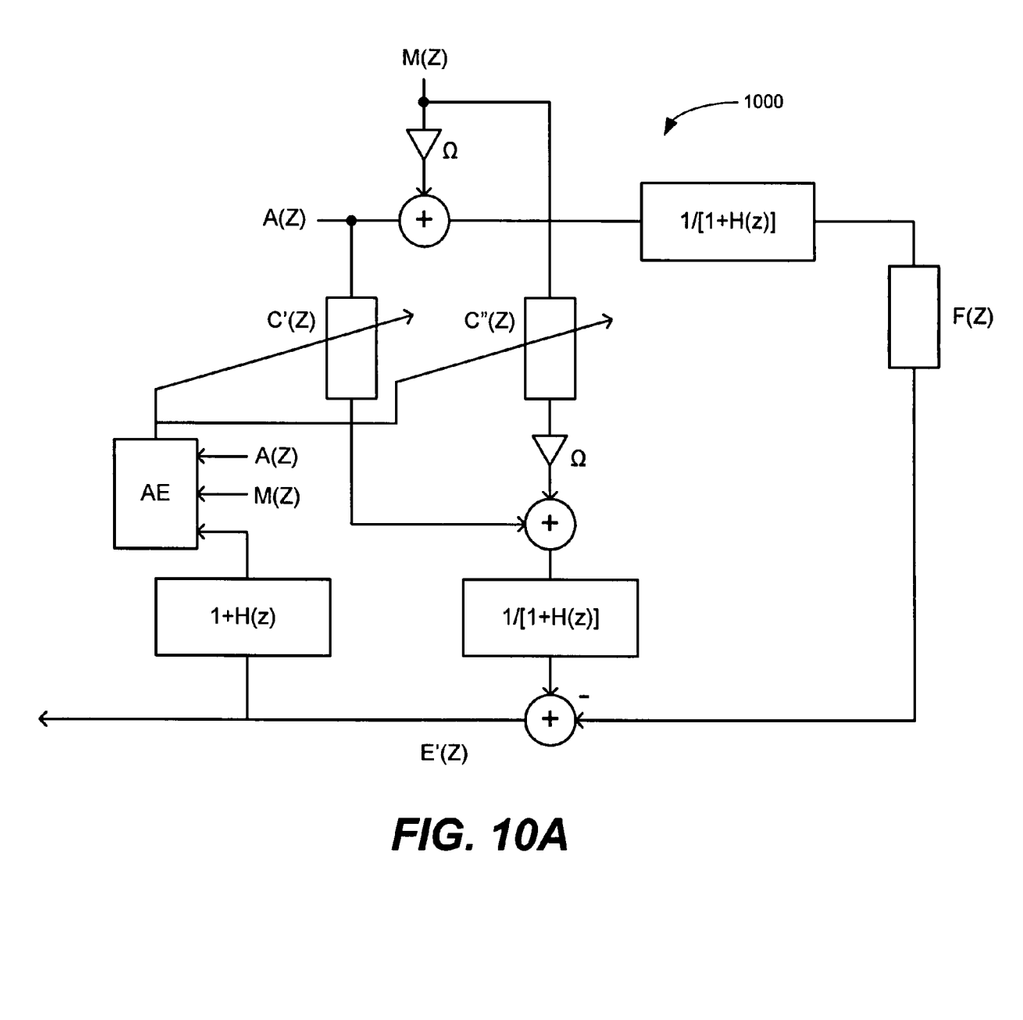
FIGS. 10A-10B respectively illustrate a left hand side (LHS) scheme and a right hand side (RHS) scheme for adapting the echo canceller of FIG. 9.
Figure 10B:
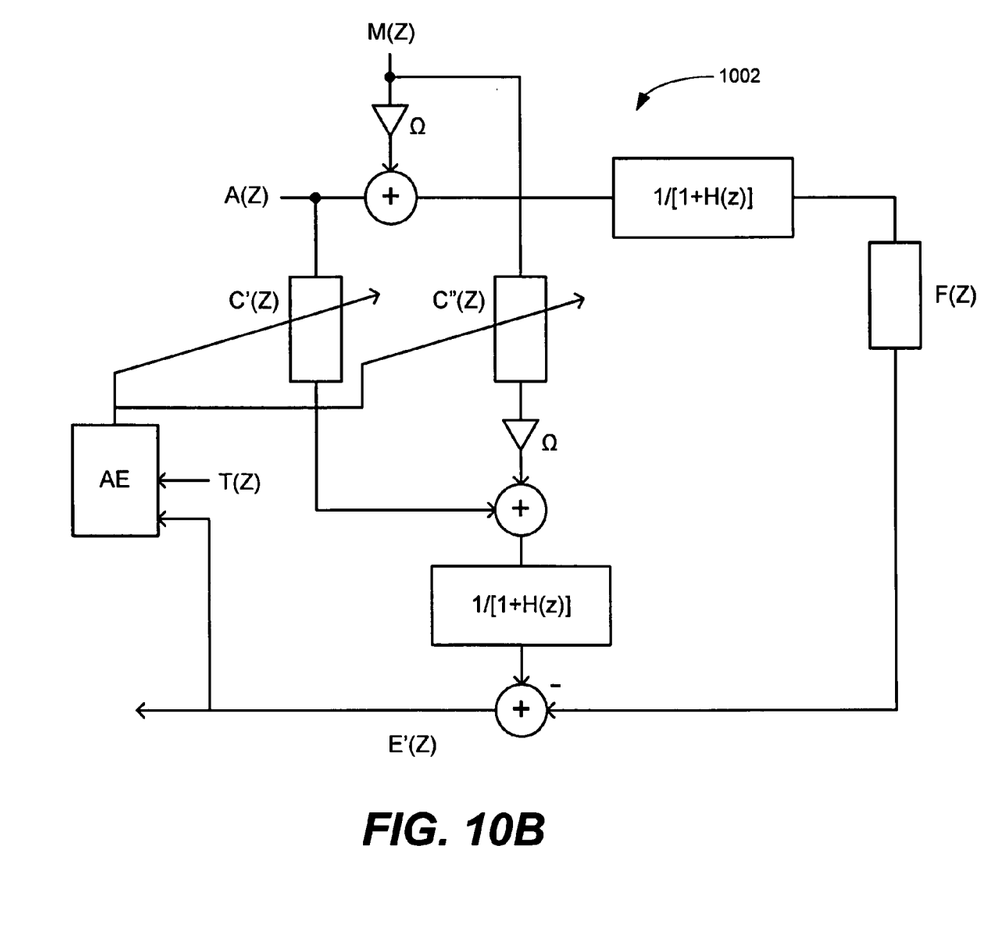

Two ways for adapting coefficients of filters associated with the echo canceller 900 are given by the left hand side (LHS) scheme 1000 and the right hand side (RHS) scheme 1002 respectively shown in FIGS. 10A and 10B. Referring first to the LHS scheme 1000, the adaptation equation as follows:

$$c'_i(k) = \qquad (\text{eq. 6})$$
$$c'_i(k-1) + \Delta \left(e'(k) + \sum_j h_j e'(k-j)\right)(a(k-1) + 32m(k-i-j)).$$

This adaptation takes the filter from its initial state, which may not be optional or even good in a performance sense to the optimal set of coefficients. In equation 6, the 32 denotes the $\Omega$ term, which is equal to the size of the wrapping term in the modulo operation and {m(k–i–j)} denotes the number of modulo wrapping operations required at time {k–i–j}.

As for the RHS scheme 1002, the adaptation equation is as follows:

$$c'_i(k) = c'_i(k-1) + \Delta e'(k)t(k-i) = c'_i(k-1) + \Delta e'(k) \qquad (\text{eq. 7})$$
$$\left(a(k-i) + 32m(k-i)\sum_j h_j(a(k-i-j) + 32m(k-i-j))\right).$$

Note that the two functions above have a differing cost function. Such a difference in the cost function affects performance between each scheme as the LHS scheme 1000 will filter an error signal {e(k)} with a {1+H(z)} channel response. Such filtering will inherently increase the cross-correlation in the noise and, therefore, increase noise in the adaptation loop. This has implications for the speed at which adaptation can occur and the optimality of the end result.

Figure 11A:
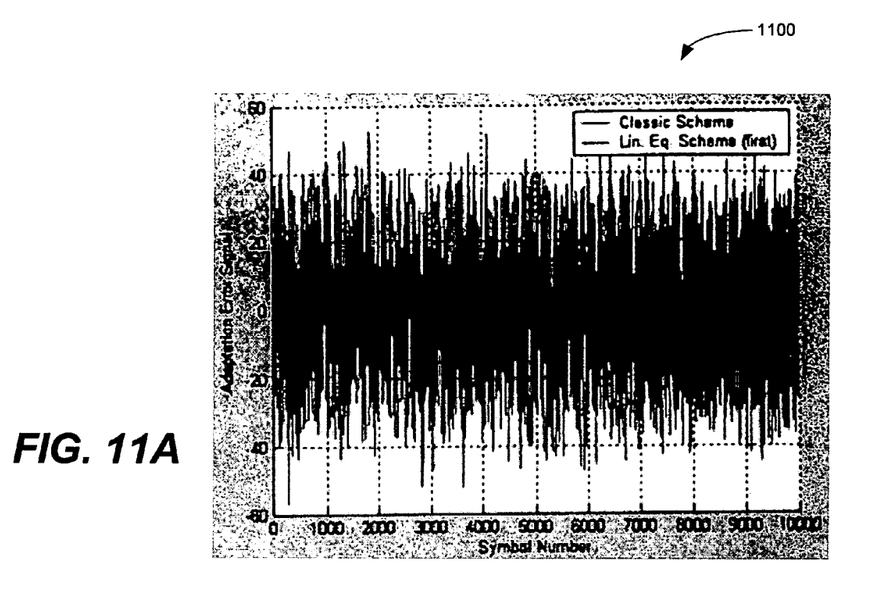
FIGS. 11A-11B respectively illustrate Matlab simulations of the LHS scheme and the RHS scheme of FIGS. 10A-10B.
Figure 11B:
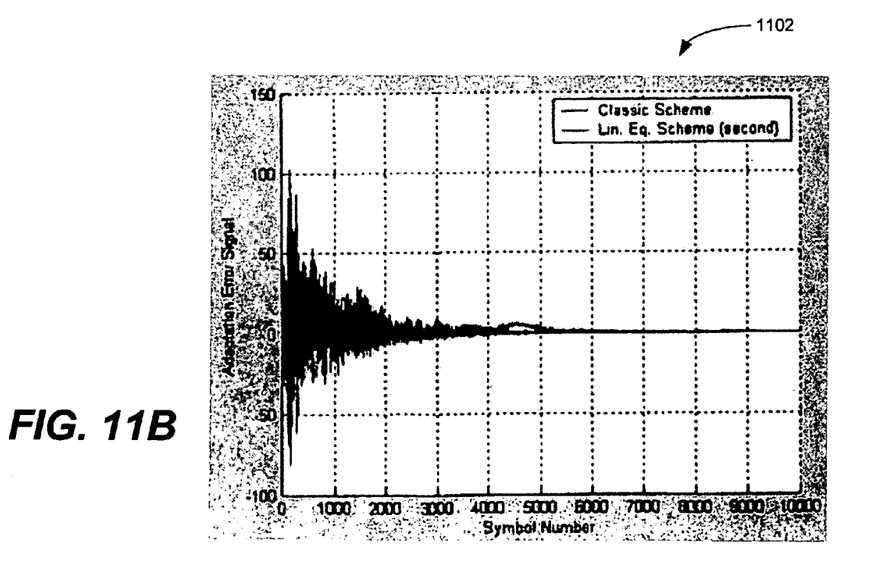

FIGS. 11A and 11B respectively show a Matlab simulation 1100, 1102 for the LHS scheme 1000 and the RHS scheme 1002. A comparison between the Matlab simulations 1100, 1102 reveals that the LHS scheme 1000 is a lot less stable when $|h_i|>>0$. The RHS scheme 1002 work well in that the adaptation cost function is the same as in the case that the echo canceller were placed after the THP. Also, based on THP theory, T(z) is spectrally flat and, therefore, {t(k)} is uncorrelated. Thus, the noise introduced by the summation is lower. Note that the RHS scheme 1002 will require the implementation of additional THP circuitry, however, such THP circuitry can be implemented at low cost since the THP circuitry is off the data path.

Various implementations of a transceiver architecture have been described. Nevertheless, various modifications may be made to the implementations, and those modifications would be within the scope of the present invention. Accordingly, many modifications may be made without departing from the scope of the present invention.

What is claimed is:

1. A transceiver comprising:
   a non-linear precoder that implements Tomlinson-Harashima Precoding (THP) to pre-equalize a data signal transmitted from the transceiver; and
   an interference cancellation system including an echo canceller to substantially cancel interference from a data signal received by the transceiver;
   wherein the non-linear precoder and the interference cancellation system share at least one common input signal, and where inputs to the echo canceller are given by inputs to the nonlinear precoder and modulo wrap values.

2. The transceiver of claim 1, wherein the interference cancellation system further comprises a Near-End Cross Talk (NEXT) canceller.

3. The transceiver of claim 1, wherein the echo canceller comprises one or more adaptive filters for generating a signal to mimic echo within a data signal received by the transceiver.

4. The transceiver of claim 3, further comprising a subtractor to subtract the signal generated by the one or more adaptive filters from the data signal received by the transceiver to substantially remove echo from the received data signal.

5. A method comprising:
   pre-equalizing a data signal transmitted from a transceiver using a non-linear precoder in accordance with Tomlinson-Harashima Precoding (THP); and
   substantially cancelling interference from a data signal received by the transceiver using an interference cancellation system including an echo canceller,
   wherein the non-linear precoder and the interference cancellation system share at least one common input signal, and where inputs to the echo canceller are given by inputs to the nonlinear precoder and modulo wrap values.

6. The method of claim 5, wherein the interference cancellation system further comprises a Near-End Cross Talk (NEXT) canceller.

7. The method of claim 5, wherein substantially cancelling interference from a data signal comprises generating a signal to mimic echo within a data signal received by the transceiver using one or more adaptive filters associated with the echo canceller.

8. The method of claim 7, further comprising subtracting the signal generated by the one or more adaptive filters from the data signal received by the transceiver to substantially remove echo from the received data signal.

* * * * *